Patented May 16, 1933

1,909,676

UNITED STATES PATENT OFFICE

GEORGE R. HENSHALL, OF VANCOUVER, BRITISH COLUMBIA, CANADA

FISH REDUCTION PROCESS

No Drawing. Application filed September 29, 1928, Serial No. 309,361, and in Canada January 26, 1928.
Renewed November 3, 1932.

This invention relates to an improved process whereby fish and fish offal such as pilchards, herring, dog-fish, salmon and the refuse of same is chemically and mechanically treated so as to produce oil, fish meal, fertilizer and the like for industrial purposes.

The invention bears special reference to a patent of Canada granted to E. G. Henshall and dated June 11th, 1912, and numbered 140,993, and is an improvement and further development of the aforesaid patent.

In the operation of the process referred to in the aforesaid patent, ferrous sulphate is used in connection with a cooking of the fish material; but this method does not bring into effect the necessary coagulation of the proteins which is indispensible for the ready extraction of the oil and hence results in a certain inefficiency which is remedied by my process. Moreover it tends to emulsify the oil and the expressed liquor which is a further source of loss arrested by my invention.

In my process I employ instead of ferrous sulphate ($FeSO_4$) ferric sulphate ($Fe_2(SO_4)_3$) preferably or frequently in combination with aluminium sulphate

($Al_2(SO_4)_3$).

The fish material is treated with a suitable solution of these salts for a short time which causes the proteins to coagulate very rapidly and shortens the duration of the required cooking period, affording a more effective extraction of oil—of a clearer and finer quality—with corresponding improvement in the texture and colour of the meal.

In this improved process the fish and fish offal is cut or ground into small pieces or pulp, and to this a percentage of ferric sulphate varying from two and a half to three phate varying from two and a half to three in solution is added, the mass being left to pickle for a period of from two to twenty-four hours according to class and quality of fish used. This has the effect of releasing all or practically all the oil because of the more effective coagulation of the proteins and avoids the necessity for prolonged cooking. Its effect is so complete that there is no oil residue in combination with the expressed liquor at the conclusion of the reduction process and therefore no need for emulsification at that point, and consequently loss of solids in the liquor is reduced to a minimum.

To obtain the most efficient pickle in fish reduction as described herein I use for sprinkling the fish pulp a solution made by dissolving one hundred pounds of ferric sulphate ($Fe_2(SO_4)_3$) in about fifty gallons of water or sufficient to make a usable solution.

For certain conditions a proportion of ferrous sulphate ($FeSO_4$) up to twenty-five pounds avoirdupois may be added with advantage and it should be noted that the substitution of two-thirds the quantity of aluminium sulphate ($Al_2(SO_4)_3$) for the ferrous sulphate will produce all the results obtained by the ferrous sulphate with the added advantage of a reduction in the duration of the pickling process and the more important features that the resulting oil is of a clearer and finer quality and the meal product lighter in colour and finer in texture.

When the pickling which is carried on at any ordinary atmospheric temperature is complete, the solidified material is put through a helical conveyor surrounded by an annular jacket containing boiling water which occupies but a few minutes (say ten to twenty) owing to the more efficient preliminary treatment before described. The material thence passes through a compound helical compressor for the extraction of the oil content and moisture.

Having now particularly described my invention, what I claim and desire to be protected in by Letters Patent is:

1. In a fish-fat recovery process in which the fish material is subjected to a mechanical pulping process, the pickling of the said material for coagulating the proteins with a solution made by dissolving 100 pounds of ferric sulphate in 50 gallons of water.

2. In a fish-fat recovery process in which the fish material is subjected to a mechanical pulping process, the pickling of it with a solution made dissolving 100 pounds avoirdupois of ferric sulphate in 50 gallons of water into which has been dissolved a relatively small quantity of ferrous sulphate, then allowing the treated material to stand until coagulation of the proteins is complete, and afterwards heat treating it by passing through conveyors submerged in water which is regulated to afford a temperature varying from approximately 200 degrees Fahr. at the start to approximately 100 degrees Fahr. at the finish of the operation.

3. In a fish-fat recovery process in which the fish material is subjected to a mechanical pulping process and thence pickling it in a solution of ferric sulphate in combination with relatively small quantities of ferrous sulphate and aluminum sulphate.

In testimony whereof I affix my signature.

GEORGE R. HENSHALL.